United States Patent
Lejay

(10) Patent No.: US 11,426,736 B2
(45) Date of Patent: Aug. 30, 2022

(54) GRIPPING DEVICE FOR A CONTAINER

(71) Applicant: DIAGNOSTICA STAGO, Asnieres sur Seine (FR)

(72) Inventor: Fabrice Lejay, Baguer Pican (FR)

(73) Assignee: DIAGNOSTICA STAGO, Asnieres sur Seine (FR)

( * ) Notice: Subject to any disclaimer, the term of this patent is extended or adjusted under 35 U.S.C. 154(b) by 329 days.

(21) Appl. No.: 16/405,138

(22) Filed: May 7, 2019

(65) Prior Publication Data

US 2019/0336978 A1  Nov. 7, 2019

(30) Foreign Application Priority Data

May 7, 2018  (FR) ...................... 1853922

(51) Int. Cl.
- *B01L 9/06* (2006.01)
- *B01L 3/00* (2006.01)
- *G01N 35/02* (2006.01)
- *G01N 35/04* (2006.01)

(52) U.S. Cl.
CPC ............... *B01L 9/06* (2013.01); *B01L 3/5453* (2013.01); *G01N 35/025* (2013.01); *G01N 35/04* (2013.01); *B01L 2200/18* (2013.01); *G01N 2035/0406* (2013.01)

(58) Field of Classification Search
CPC ...... B01L 9/06; B01L 3/5453; B01L 2200/18; B01L 2200/023; B01L 2300/0858; B01L 9/50; G01N 35/025; G01N 35/04; G01N 2035/0406; B01F 9/003; B01F 9/10; B01F 15/0074; B01F 2009/0061; A47G 23/0208; B08B 9/423; B08B 9/426
See application file for complete search history.

(56) References Cited

U.S. PATENT DOCUMENTS

| | | | |
|---|---|---|---|
| 3,918,920 A * | 11/1975 | Barber | B01L 9/06 422/560 |
| 5,897,090 A | 4/1999 | Smith et al. | |
| 2005/0159512 A1* | 7/2005 | Rousseau | G01N 35/026 523/455 |
| 2006/0266719 A1 | 11/2006 | Knight et al. | |
| 2010/0015007 A1* | 1/2010 | Pedrazzini | B01L 9/06 422/64 |
| 2013/0027185 A1* | 1/2013 | Lavi | B01L 9/06 340/10.1 |
| 2014/0193300 A1* | 7/2014 | Bernhard | B01L 9/06 422/64 |
| 2017/0248624 A1 | 8/2017 | Kaeppeli et al. | |

OTHER PUBLICATIONS

French Search Report, FR 1853922, filed Nov. 27, 2018.

\* cited by examiner

*Primary Examiner* — Jill A Warden
*Assistant Examiner* — John McGuirk
(74) *Attorney, Agent, or Firm* — Nixon & Vanderhye

(57) ABSTRACT

Disclosed is a gripping device for a container intended for a biological analysis, including an annular part of X axis, elastically deformable gripping fins extending radially inwardly from the annular part, the fins being capable of being deformed when a container is introduced into the annular part, the fins being evenly distributed over the circumference. Each fin has a so-called upper surface and an opposite so-called lower surface, the lower surface being intended to come into contact with the container, the lower surface having a concave zone, or vice versa.

12 Claims, 3 Drawing Sheets

GRIPPING DEVICE FOR A CONTAINER

FIELD OF THE INVENTION

The invention relates to a gripping device for a container intended for a biological analysis, such as a vial or a test tube intended to contain a reagent or a sample for a biological analysis within an analytical apparatus.

BACKGROUND

In an analytical apparatus, containers are generally handled and moved between different zones or stations of the analytical device using automated systems. There is currently a wide variety of container sizes, each dimension depending on the type of reagent or sample used.

Containers are generally placed in storage and/or gripping devices, the latter allowing the storage, handling and/or transport of the containers between the different stations or zones of the analytical apparatus.

To accommodate a wide variety of container sizes, a widely used solution consists in using adapters to adapt container sizes to the dimensions of the storage and/or gripping device used. The use of such adapters is tedious and slows down the rate of analysis.

U.S. Pat. No. 5,897,090 discloses an analytical tube holder with an annular portion and an elastic member including a series of elastic tabs surrounding the tube. A cap is mounted in the lower part of the annular part to support the lower end of the tube. The elastic tabs allow the tube to be centered while the cap allows the tube to be axially held in position.

Such a support does not allow to adapt to important differences in diameter between the different tubes. In addition, such a support does not allow direct access to the lower part of the tube, containing the sample or the reagent, in order to maintain its temperature by conduction for example. Finally, such a support does not allow the tube to be stirred effectively.

There is currently a need to allow the handling and transport of containers of different diameters, while allowing in particular the stirring and effective temperature control thereof.

SUMMARY OF THE INVENTION

The invention aims to remedy these various constraints in a simple, reliable and inexpensive way.

For this purpose, the present invention relates to a gripping device for a container intended for biological analysis, comprising an annular part of X axis, elastically deformable gripping fins extending radially inward from the annular part, the fins being capable of being deformed when a container is introduced into the annular part, the fins being evenly distributed over the circumference, characterized in that each fin has a so-called upper surface and an opposite so-called lower surface, the lower surface being intended to come into contact with the container, said lower surface having a concave zone, or vice versa.

In use, a container such as a vial or a test tube can be inserted into the annular part of the gripping device between the free ends of the tabs. When the container is introduced, the tabs are deformed and ensure that the container is held in position between the tabs due to the elasticity of the tabs and the friction generated on the outer surface of the container. The tabs can be sized to allow a large variability in the diameter of the container, for example a diameter that can vary by a factor of 1 to 3. Once the container is positioned inside the gripping device, the lower part of the container is accessible from the outside, in particular to allow the stirring of the reagent or the sample inside the container and/or the maintaining of the temperature thereof by convection or conduction. Indeed, the lower end of the container can be placed directly on a temperature-controlled surface, for example using a Peltier-type element.

The presence of a concave zone at each tab enables the stresses to be distributed in the tab and allows a large deformation of the tab without exceeding the mechanical specifications of the material in terms of maximum allowable stresses. In other words, such a concave zone makes it possible to maintain a sufficient force on the container to ensure its maintenance while allowing sufficient deformation to accept large variations in the diameter of the container.

The contact zone between the outer surface of the container and the bottom surface of each tab can be a linear zone or one or more spot zone(s).

The zone of contact of each tab with the outer surface of the container, for example, is formed by two spot or almost-spot zones, respectively at the radially inner end and the radially outer end of the concave zone. The shape of the concave zone is then adapted accordingly. Such contact zones make it possible to improve the holding of the container between the tabs.

In such a case, the central or middle zone of the concave zone is not intended to come into contact with the outer surface of the container.

Alternatively, the zone of contact between the tab and the outer surface of the container can be formed by the peripheral edge of the concave zone.

Outside the concave zone, the lower and upper surfaces can be flat.

Said concave zone may have the shape of an ellipse portion in the radial direction.

Said concave zone may have the shape of an ellipse portion in a direction perpendicular to the radial direction.

The annular part may have external peripheral gearing teeth, intended to cooperate with rotating drive means.

The peripheral gearing teeth thus enable the gripping device and the container to be driven in rotation, so that the latter can be stirred.

The annular part may also be toothless and have an outer peripheral surface with one or more cylindrical zone(s) only. Such a gripping device is not intended to support containers that need to be stirred.

The tabs may be elastically deformable between a rest position in which they are not stressed, and a deformed position in which they hold the container in position, the tabs being inclined with respect to a radial plane, in the rest position.

In particular, the fins can be inclined from the bottom to the top and radially in the inwards direction. The angle of inclination of the fins is for example between 20° and 40°, preferably around 20°.

Lugs or studs can extend axially from the annular part, said lugs or studs defining circumferentially extending spaces between them.

These spaces enable, for example, the reading of a barcode affixed to the container, for example by means of appropriate reading means. The number of lugs or studs is for example limited to a number between 2 and 4.

The gripping device can be made in one single piece.

Alternatively, the gripping device may consist of at least one part, namely a first part with the tabs extending from an annular part, and at least one second annular part with, for example, the lugs and/or the peripheral gearing teeth.

The gripping device is made of a synthetic material, for example by injection moulding.

Each tab may have a first radially outer end, connected to the annular part, a second, radially inner free end, and lateral edges connecting said first and second ends, the lateral edges converging radially inwardly with respect to each other.

Such a shape enables a large number of tabs to be placed over the circumference, while ensuring a high degree of deformability of the tabs.

The invention also relates to an assembly comprising a conveyor system comprising a conveyor track and at least one toothed wheel capable of being driven in rotation and located in a stirring zone of the conveyor track, said assembly comprising at least one gripping device of the aforementioned type, the toothed wheel being capable of engaging with the external peripheral gearing teeth of the gripping device so as to drive it in rotation.

The invention also relates to a biological analysis apparatus comprising at least one assembly of the aforementioned type and/or at least one gripping device of the aforementioned type.

The invention will be better understood and other details, characteristics and advantages of the invention will appear when reading the following description, which is given as a non-limiting example, with reference to the attached drawings.

DETAILED DESCRIPTION

Figure 1:
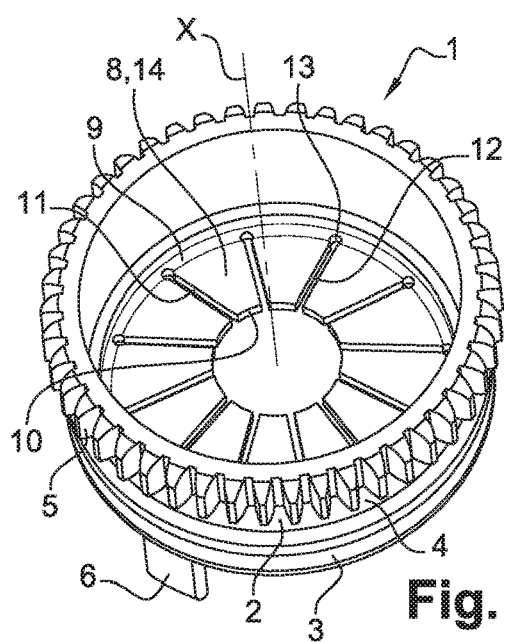
FIG. 1 is a perspective view of a gripping device according to one embodiment of the invention.

FIGS. 1 to 8 illustrate a gripping device 1 according to one embodiment of the invention.

This one has an annular part 2 of X axis. In the description, the terms "axial" and "radial" are defined relative to the X axis. The annular part 2 comprises a cylindrical part 3 with a first diameter, referred to as the lower part 3 by reference to the position shown in the figures, a cylindrical middle part 4 with a second diameter smaller than the first diameter, and an upper part with gearing teeth 5.

Studs or lugs 6, here three in number, axially extend from the lower end of the annular part 2. The studs 6 are evenly distributed over the circumference and circumferentially define spaces 7 between them.

Elastically deformable fins 8 extend radially inward from the lower part of the annular part 2. The fins 8 can be produced in one piece with the rest of the annular part 2. Alternatively, the fins 8 and a portion of the lower part can be formed in one piece and assembled with other portions of the annular part 2, for example by overmoulding. Such an embodiment makes it possible to use distinct materials, as is known per se.

Each fin 8 has, when viewed from above, a general trapezoidal shape and has a radially outer end 9 connected to the annular part 2, a radially inner free end 10 and two lateral edges 11 connecting the radially inner 9 and outer 10 ends.

The radially inner 9 and outer 10 ends have arcuate shapes.

The fins 8 are evenly distributed over the circumference, with the lateral edges 11 of two adjacent fins 8 defining slots 12. The radially outer ends of the slots 12 have rounded zones 13 with a larger diameter than the width of the slots 12, so as to form mechanical stress distribution zones and prevent damage to the fins 8 at the radially outer end 9 thereof.

The radially inner ends 10 of the fins 8 define a central opening with a diameter D1 between 7 and 15 mm, for example. The internal diameter of the annular part 2, noted D2, is for example between 20 and 50 mm. In general, the D2/D1 ratio is for example between 2 and 3.

The width of the slots 12 is for example between 0.8 and 1 mm. The number of fins 8 is for example between 8 and 16.

Figure 2:
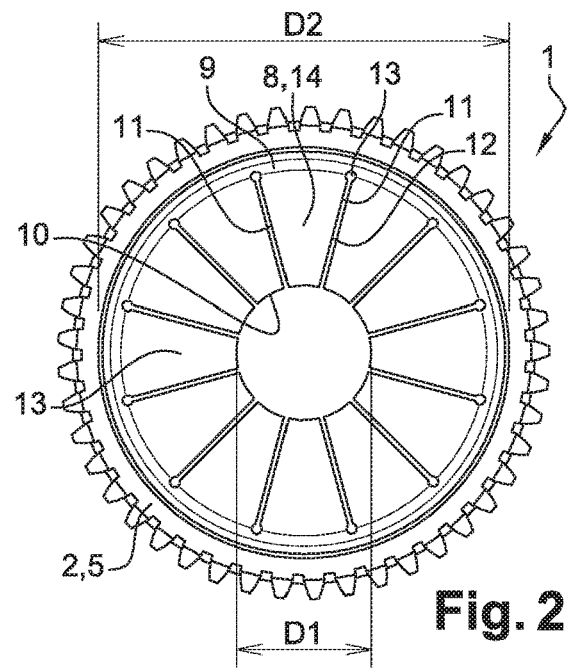
FIG. 2 is a top view of the gripping device.
Figure 3:
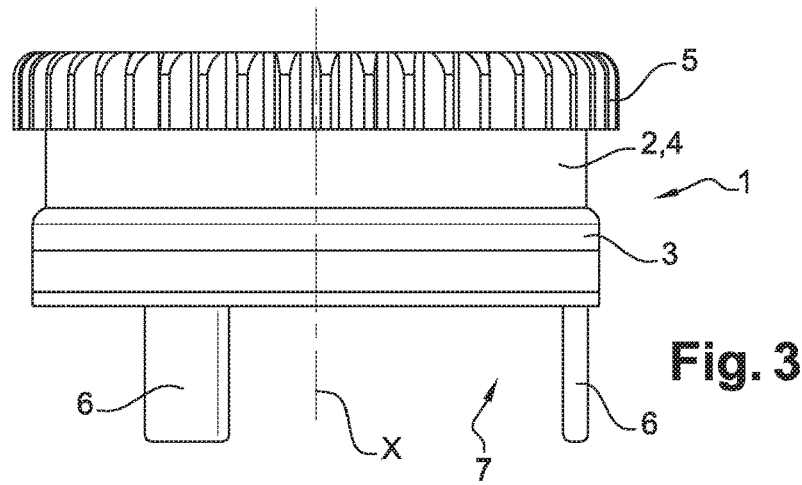
FIG. 3 is a side view of the gripping device.
Figure 6:
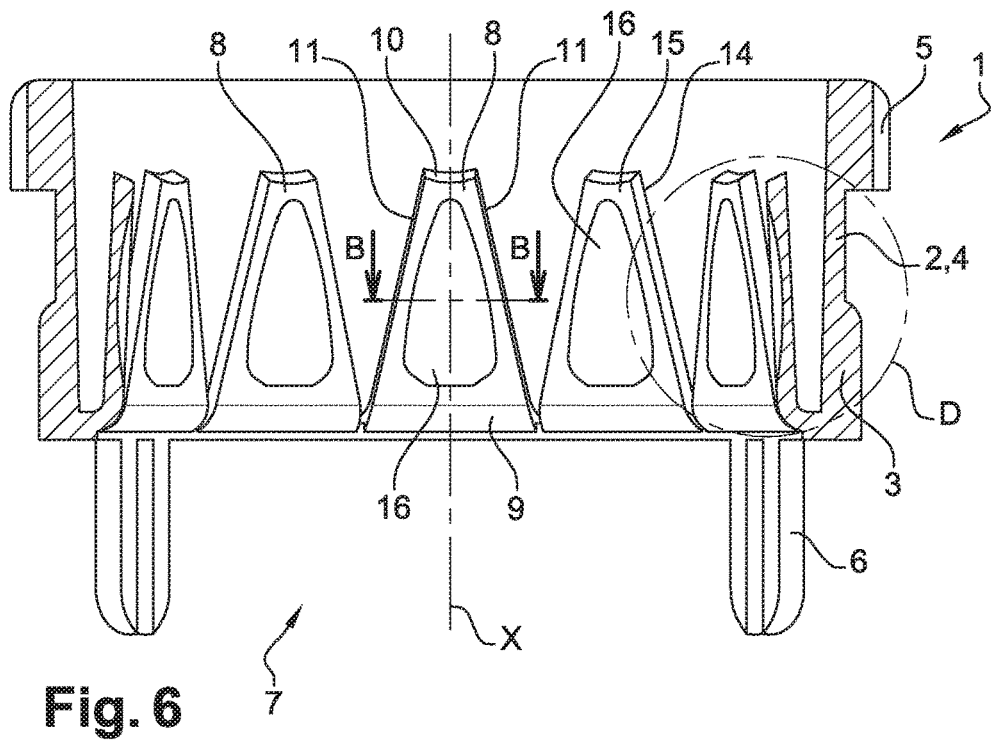
FIG. 6 is an axial cross-sectional view of a gripping device, according to another embodiment, the tabs being represented in a deformed position.
Figure 7:
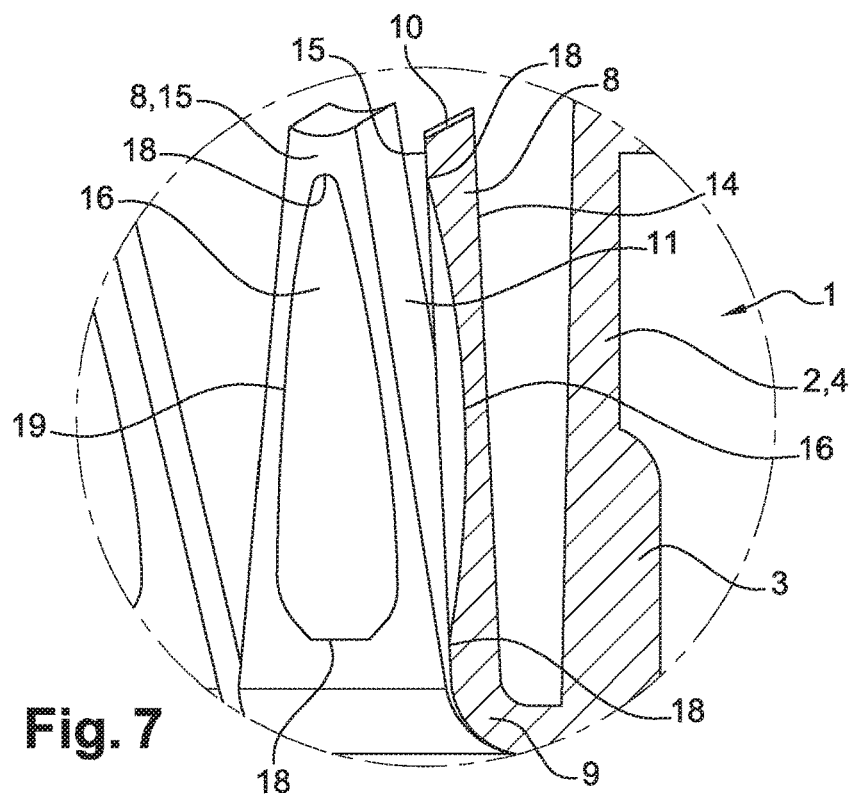
FIG. 7 is a view of a detail D of FIG. 6.

The fins 8 are elastically deformable between a rest position, shown in FIGS. 1 and 2, and a deformed position, shown in FIGS. 6 and 7.

In the rest position, the fins 8 can extend in a radial plane or, on the contrary, form an angle with said radial plane. In this case, the corresponding angle is for example between 20° and 40°. In this case too, the fins 8 can be radially inclined in the inwards direction and axially from the bottom to the top. In other words, when the fins 8 are inclined, the radially inner ends of the fins 8 can be oriented towards the outer gearing teeth 5 of the annular part 2.

Figure 8:
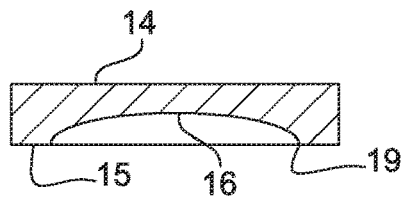
FIG. 8 is a view along section B-B of FIG. 6.

Each fin 8 has a so-called upper surface 14 and a so-called lower surface 15. The upper surface 14 is flat. The lower surface 15 has a concave portion 16, bi-elliptical in shape. In other words, in a radially oriented cross-sectional plane, the concave surface 16 has an ellipse portion shape (as shown on the fin 8 sectional view in FIG. 7) and, in a cross-sectional plane oriented perpendicularly to the radial direction (section B-B in FIG. 6), the concave portion 16 also has an ellipse portion shape (as shown in FIG. 8).

The bi-elliptical shape is defined in such a way as to distribute the mechanical stresses in each fin 8 when deforming said fins 8, so as not to exceed a maximum permissible value and thus avoid premature deterioration of the fins 8.

Figure 4:
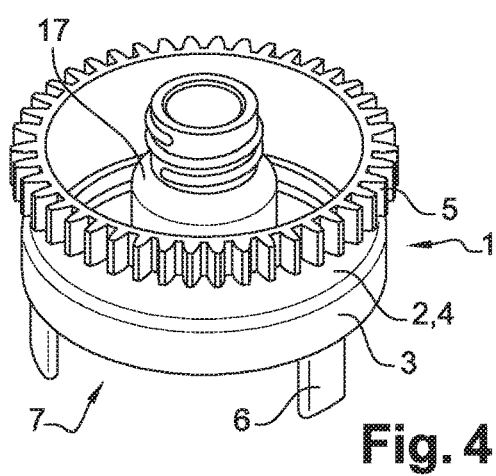
FIG. 4 is a perspective view schematically illustrating the position of a small diameter vial in the gripping device.
Figure 5:
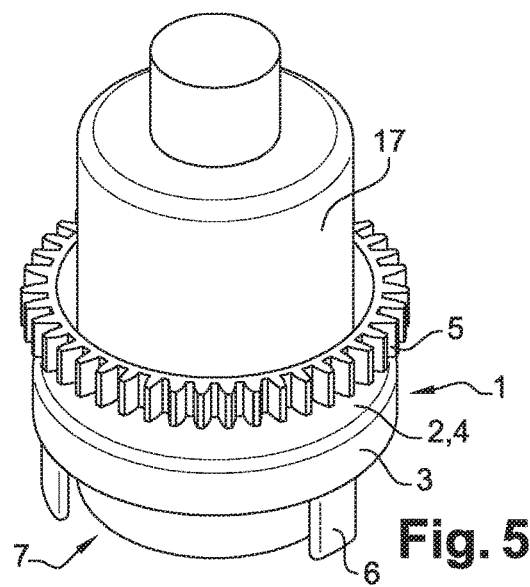
FIG. 5 is a perspective view schematically illustrating the position of a large diameter vial in the gripping device.

In use, a vial 17 can be inserted between the radially inner ends 10 of the fins 8, through the lower end of the gripping device 1. During this introduction, the fins 8 are deformed upwards and the lower surface of the fins 8 rests against the outer surface of the vial 17. FIG. 4 illustrates the case of an introduction of a small diameter vial 17 and FIG. 5 illustrates the case of an introduction of a large diameter vial 17.

It can be seen that such a gripping device 1 allows the use of vials 17 of very different sizes. The diameter of the vial 17 may, for example, vary by a ratio of 3.

After the introduction of the vial 17, the contact zones between the lower surface 15 of each fin 8 and the vial 17 may be limited to the radially inner and outer end zones 18 of the concave surface 16, or to the periphery 19 of the concave surface 16, for example (FIG. 7).

The contact between the fins 8 and the vial 17, on the one hand, and the elastic return force exerted by the fins 8, on the other hand, enable the vial 17 to be held in position in the gripping device 1. In other words, the vial 17 is held axially and centred in the gripping device 1.

Of course, other types of containers can also be used, such as tubes.

Figure 9:
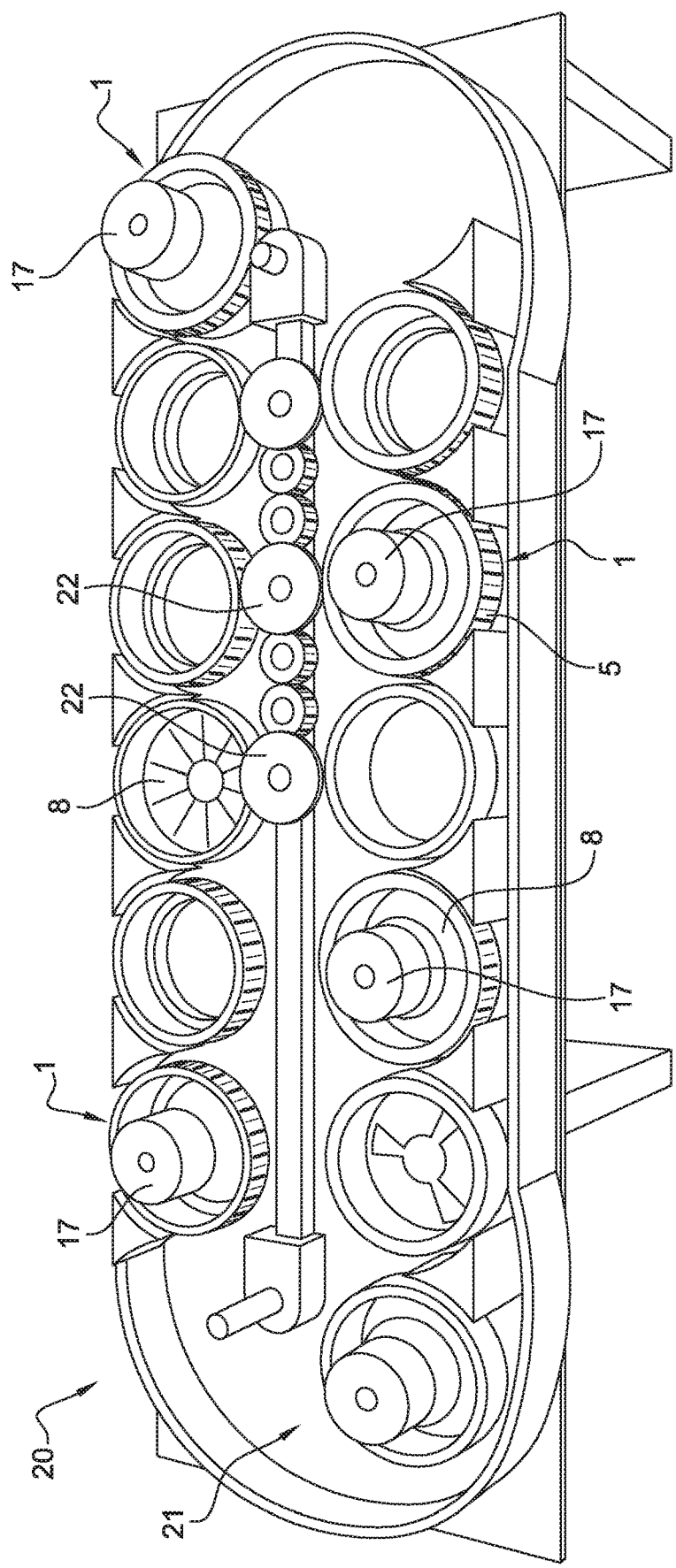
FIG. 9 is a perspective view of a conveyor system on which several gripping devices according to the invention are arranged.

Such gripping devices 1 are intended for use in a conveyor system 20, shown in FIG. 9. The conveyor system 20 comprises a conveyor track 21 and at least one rotationally drivable toothed wheel 22 located in a stirring zone of the conveyor track 21, each toothed wheel 22 being able to engage with the outer peripheral gearing teeth 5 of the gripping device 1 so as to drive it in rotation.

The rotation drive of the gripping device 1 and the vial 17 it supports makes it possible to stir its contents, for example a reagent or a biological sample to be analysed.

In addition, the vials 17 may have one or more bar code(s) located opposite the spaces or circumferential openings 7, said bar codes enabling the identification of the contents of the vials 17 in an analytical apparatus for example.

It should also be noted that once the vial 17 is positioned inside the gripping device 1, the lower part of the vial 17 is accessible from the outside to make it possible to maintain the reagent or sample temperature inside the vial 17, by conduction for example. Indeed, the lower end of the vial 17 can be placed directly on a surface, the temperature of which is controlled, for example by means of a Peltier type element.

The invention claimed is:

1. A gripping device for a container configured for a biological analysis, the gripping device comprising:
   an annular part of X axis; and
   elastically deformable gripping fins extending radially inwardly from the annular part to the X axis, each of the fins having a radially inner free end, the radially inner free ends of the fins defining a central opening in a rest position in which the fins are not stressed, the fins being configured to be deformed when a container is introduced into the annular part, the fins being evenly distributed over the circumference of the gripping device, each of the fins having an upper surface and an opposite lower surface, the lower surface or the upper surface being configured to come into contact with the container, said lower surface comprising a concave zone having a bi-elliptical shape, the fins being inclined radially inward with an angle of inclination between 20 and 40 degrees relative to a radial plane,
   wherein radially outer ends of slots defined between adjacent fins of the gripping fins have circular-shaped rounded area zones having a larger diameter than the width of the slots.

2. The gripping device according to claim 1, wherein the annular part has external peripheral gearing teeth configured to cooperate with a rotating drive.

3. The gripping device according to claim 1, wherein the fins are elastically deformable between the rest position in which the fins are not stressed, and a deformed position in which the fins hold the container in position, the fins being inclined with respect to a radial plane, in the rest position.

4. The gripping device according to claim 1, wherein lugs or studs extend axially from the annular part, said lugs or studs defining circumferentially extending spaces between the lugs or studs.

5. The gripping device according to claim 1, wherein each of the fins further includes a radially outer end connected to the annular part and lateral edges connecting said outer and inner ends, the lateral edges converging radially inwards with respect to each other.

6. An assembly comprising:
   a conveying system comprising a conveying track and at least one rotationally drivable toothed wheel located at a stirring zone of the conveying track;
   at least one of the gripping devices according to claim 2, the toothed wheel being configured to engage with the outer peripheral gearing teeth of the at least one gripping device to drive the at least one gripping device in rotation.

7. A biological analysis apparatus comprising at least one of the assemblies according to claim 6.

8. The gripping device according to claim 2, wherein lugs or studs extend axially from the annular part, said lugs or studs defining circumferentially extending spaces between the lugs or studs.

9. The gripping device according to claim 2, wherein each of the fins has a radially outer end connected to the annular part, and lateral edges connecting said outer and inner ends, the lateral edges converging radially inwards with respect to each other.

10. The gripping device according to claim 3, wherein each of the fins has a radially outer end connected to the annular part, and lateral edges connecting said outer and inner ends, the lateral edges converging radially inwards with respect to each other.

11. A biological analysis apparatus comprising:
    at least one of the gripping devices according to claim 1.

12. A biological analysis apparatus comprising:
    at least one of the gripping devices according to claim 2.

* * * * *